United States Patent [15] 3,640,694
Giddings et al. [45] Feb. 8, 1972

[54] METHOD OF TOUGHENING GLASS IN AN OIL BATH

[72] Inventors: David George Giddings, Stourbridge; Douglas Twist, Hollywood, near Birmingham, both of England

[73] Assignee: Pilkington Brothers Limited, Liverpool, England

[22] Filed: Dec. 30, 1969

[21] Appl. No.: 889,341

[30] Foreign Application Priority Data

Jan. 8, 1969 Great Britain .........................1,263/69
June 24, 1969 Great Britain .........................3,195/69

[52] U.S. Cl. ..............................................................65/116
[51] Int. Cl. ......................................................C03b 27/00
[58] Field of Search ...............................65/116; 148/28, 29

[56] References Cited

UNITED STATES PATENTS 1,959,215   5/1934   Owen.........................................65/116
2,198,739   4/1940   Phillips.......................................65/116

FOREIGN PATENTS OR APPLICATIONS 316,108   11/1956   Switzerland .............................65/116

Primary Examiner—Arthur D. Kellogg
Attorney—Imirie and Smiley and Snyder and Butrum

[57] ABSTRACT

Glass of thickness in the range 0.5 mm. to 2.5 mm. is toughened by heating the glass to a temperature near to its softening point and then quenched with a selected oil whose viscosity is in the range 300 to 1,000 centistokes at 38° C. and whose flash point is in the range 220° to 310° C., whilst maintaining the temperature of the oil in the range 150° to 240° C. There is thereby induced in the glass a ratio of surface compressive stress to central tensile stress in the range 1.5:1 to 3.5:1.

10 Claims, No Drawings

METHOD OF TOUGHENING GLASS IN AN OIL BATH

BACKGROUND OF THE INVENTION

This invention relates to the toughening of glass, and more especially to the manufacture of thin toughened glass.

This toughened glass may be used as a single sheet or as a laminated glass assembly for the windscreen, back light or side lights of a motor vehicle.

SUMMARY

In accordance with the invention a method of toughening glass whose thickness is in the range 0.5 mm. to 2.5 mm., comprises heating the glass to a temperature near to its softening point, and quenching the hot glass with a selected oil maintained at a temperature in the range 150° to 240° C. to induce in the glass a ratio of surface compressive stress to central tensile stress in the range 1.5:1 to 3.5:1.

The selected oil has a viscosity in the range 300 to 1,000 centistokes at 38° C. and a flash point in the range 220° to 310° C.

The invention is particularly applicable to the toughening of soda-lime-silica glass that is heated to a temperature in the range 600° to 740° C.

The invention also provides toughened glass whose thickness is within the range 0.5 mm. to 2.5 mm., and has a ratio of surface compressive stress to central tensile stress in the range 1.5:1 to 3.5:1.

The invention further provides a laminated glass assembly incorporating at least one sheet of such toughened glass.

DESCRIPTION OF THE PREFERRED EMBODIMENTS

In each of the examples set out below a thin sheet of glass, for example 30 cm. × 30 cm. and of ordinary soda-lime-silica glass composition, was toughened by quenching in a selected oil.

A preferred range for the initial glass temperature is 600° to 740° C. and it was found that the modulus of rupture of the glass depends on its initial temperature. Also, it has been found advantageous in preserving the surface quality of the glass to work towards the hotter end of this temperature range. However, a medium temperature in the range is suitable, and in a number of the examples the glass was heated to about 700° C. and then lowered through as short a path as possible into a bath of chilling oil. In each example, the oil is a fresh clean oil and is heated and continuously circulated through the tank so that the temperature of the oil is maintained in the range 150° to 240° C. and preferably at 200° C.

The viscosity of the oil and its constitution have been found to have a bearing on the stresses produced in the glass. The more viscous the oil, the higher the stress produced in the glass. Generally the more viscous oils have a higher flash point and for the present purposes the selection of the oil is defined in terms of its viscosity and its flash point. Both these factors influence the initial boiling point of the first distillate from the oil and thus are an indication of the constitution of the oils selected.

It has been found that the required modulus of rupture and central tensile stress, as well as the required ratio of surface compressive stress to central tensile stress, can be produced by selecting oils whose viscosity is in the range 300 to 1,000 centistokes at 38° C. and whose flash point is in the range 220° to 310° C.

Prior to the heating of the glass it has been found advantageous to effect a preliminary edge preparation of the glass and a bright edge finish is given to the glass by first working the edge with a "linisher" carborundum belt and then finishing the edges of the glass with a "linisher" belt of cork impregnated with ceri-rouge.

The sheet of thin glass to be toughened is suspended by means of tongs in a vertical heating furnace with an exit mouth in its lower face. When the glass has been heated to an initial temperature within the range 600° to 740° C., the tank of chilling oil which is maintained at a temperature within the range 150° to 240° C., is raised to be as near as possible to the lower mouth of the furnace and the suspended hot glass is lowered at a controlled rate of 30 cm. per second into the oil. There is an initial sharp chilling of the glass with some fuming from the oil and thereafter the glass gradually cools to the temperature of the oil and the desired stresses are produced in the glass by the time it reaches the temperature of oil and can be removed for washing.

The table quoted below gives a number of examples of the stresses obtained by quenching a glass pane in a selected oil. In each example, the pane was 30×30 cm., which when it was heated to the initial temperature given in the table, was lowered at a controlled rate of 30 cm. per second into a tank of fresh oil maintained at the temperature given in the table.

The thickness of the glass, the initial temperature of the glass and the oil temperature were varied to both extremes of the particular ranges quoted above. Also the selected oils comprise three different oils and the particular oil used in each example is given in the table. The first oil was Cylrex 200 M (Mobil Oil Company), a heavy naphthenic oil whose flash point is 305° C. and whose viscosity is 974 centistokes at 38° C. The next oil was Cylrex FM (mobil Oil Company) which is a lighter oil having a flash point of 275° C. and a viscosity of 640 centistokes at 38° C. The third oil, Vacuoline AA (Mobil Oil Company), is a lighter oil still whose flash point is 225° C. and viscosity is in the range 310 to 342 centistokes at 38° c.

The methods employed for determining the values of the modulus of rupture, central tensile stress and ratio of surface

TABLE OF EXAMPLES

| Example No. | Thickness of glass in mm. | Temperature of glass °C. | Type of Oil (Mobil Oil Company) | Temperature of oil °C. | Modulus of rupture in Kg/cm² | Central tensile stress in Kg/cm² | Ratio of surface compressive stress to central tensile stress |
|---|---|---|---|---|---|---|---|
| 1 | 0.5 | 740 | Cylrex 200 M | 150 | 1680 | 390 | 3:1 |
| 2 | .5 | 700 | Cylrex FM | 240 | 1450 | 300 | 2.5:1 |
| 3 | .5 | 700 | Vacuoline AA | 200 | 1550 | 300 | 2.5:1 |
| 4 | 1 | 700 | Cylrex 200 M | 200 | 1550 | 350 | 3:1 |
| 5 | 1 | 685 | Cylrex FM | 220 | 1680 | 390 | 3:1 |
| 6 | 1 | 720 | Cylrex FM | 175 | 1750 | 420 | 3:1 |
| 7 | 1 | 660 | Vacuoline AA | 150 | 1550 | 320 | 3:1 |
| 8 | 1.8 | 650 | Vacuoline AA | 150 | 1600 | 350 | 3.5:1 |
| 9 | 2 | 670 | Cylrex 200 M | 200 | 2000 | 450 | 3.5:1 |
| 10 | 2 | 600 | Cylrex FM | 225 | 1300 | 285 | 1.5:1 |
| 11 | 2 | 630 | Cylrex FM | 225 | 1500 | 350 | 2:1 |
| 12 | 2 | 650 | Cylrex FM | 225 | 1700 | 400 | 2.5:1 |
| 13 | 2 | 675 | Cylrex FM | 220 | 1750 | 420 | 3:1 |
| 14 | 2 | 700 | Cylrex FM | 200 | 1750 | 420 | 3:1 |
| 15 | 2 | 685 | Vacuoline AA | 150 | 2000 | 450 | 3:1 |
| 16 | 2.25 | 650 | Cylrex FM | 225 | 2000 | 450 | 2.5:1 |
| 17 | 2.5 | 700 | Vacuoline AA | 200 | 2100 | 460 | 3.5:1 |
| 18 | 2.5 | 650 | Cylrex 200 M | 240 | 2100 | 460 | 3.5:1 |
| 19 | 2.5 | 650 | Cylrex FM | 200 | 2100 | 460 | 3.5:1 | compressive stress to central tensile stress quoted in the following table of examples will now be described.

The toughened glass sheet under test was placed across a pair of knife edges and a steadily increasing load was applied through a similar pair of knife edges placed near the midpoint of the glass sheet. The modulus of rupture, which effectively corresponds to the breaking stress in the convex surface of the glass sheet when in tension, was then calculated from the load applied at the instant of fracture and the cross section of the glass sheet in shear.

The central tensile stress in the toughened glass sheet was measured by an instrument developed by Triplex Safety Glass Company Limited which is employed to pass a beam of polarized light at a grazing angle into a principal surface of the glass sheet in such a manner that the beam emerges through the median of the peripheral edge surface of the sheet. The beam leaving the peripheral edge is analyzed by a Babinet compensator and the central tensile stress in the glass sheet is then obtained by observing the slope of the fringes formed in the beam and comparing this slope with a previous calibration.

Finally, the surface compressive stress of the glass sheet, for calculation of the ratio of the surface compressive stress to central tensile stress, is obtained by using the differential surface refractometer designed by the Pittsburgh Plate Glass Company. With this instrument a beam of polarized light is refracted into a principal surface of the glass sheet at a critical angle which is predetermined by the relative refractive indices of the instrument components and the glass sheet, the beam travelling close to and parallel with the surface of the sheet. The compressive stress in the surface of the sheet is related to the difference in the refractive indices for light which is polarized perpendicular and parallel to the plane of incidence, and the light which emerges from the surface is analyzed to give a measure of the surface compressive stress in the glass sheet.

These examples show that the toughening of glass at the thinner end of the thickness range is more readily effected with a heavier or more viscous oil. Similarly, the thicker is glass or the higher the initial temperature, the greater is the modulus of rupture in the resultant toughened glass.

Thus the invention provides an improved method of toughening thin glass having a thickness in the range 0.5 mm. to 2.5 mm.

The selection of particular oils for effecting the quenching of the hot glass, which oils are used in the fresh state and continuously circulated through the quenching tank, has been found most effective in producing controlled toughening of the thin glass so there is accurately achieved in the glass the preferred central tensile stress in the range 285 kg./cm.$^2$ to 460 kg./cm.$^2$, and the ratio of surface compressive stress to central tensile stress in the range 1.5:1 to 3.5:1. This ensures the necessary strength of the glass to permit it to be incorporated in motor vehicles as component parts or to be used in locations, e.g., domestic glazing, where similar strength is required.

In particular the thin toughened glass produced by the method is advantageous in a laminated windscreen. The outer sheet of this toughened glass breaks without loss of vision if struck by a sharp stone and when the inner sheet is impacted by a head the glass shatters into small particles which neither cause laceration of the occupants in the vehicle nor the interlayer of plastics material in the laminate.

We claim:

1. A method of toughening glass whose thickness is in the range 0.5 mm. to 2.5 mm., comprising heating the glass to a temperature near to its softening point, and quenching the hot glass with a selected oil whose viscosity is in the range 300 to 1,000 centistokes at 38° C. and whose flash point is in the range 220° to 310° C., while maintaining the temperature of the oil below its flash point and in the range 150° to 240° C., thereby inducing in the glass a ratio of surface compressive stress to central tensile stress in the range 1.5:1 to 3.5:1.

2. A method according to claim 1, wherein the oil induces in the glass a central tensile stress in the range 285 kg./cm.$^2$ to 460 kg./cm.$^2$.

3. A method according to claim 1, wherein the glass to be toughened is soda-lime-silica glass and wherein the glass is heated to a temperature in the range 600° to 740° C.

4. A method of toughening glass whose thickness is in the range 0.5 mm. to 2.5 mm., comprising heating the glass to a temperature near to its softening point, and quenching the hot glass with a selected oil whose viscosity is in the range 300 to 1,000 centistokes at 38° C. and whose flash point is in the range 220° to 310° C., while maintaining the temperature of the oil below its flash point and in the range 150° to 240° C., thereby inducing in the glass a ratio of surface compressive stress to central tensile stress in the range 2.5:1 to 3.5:1.

5. A method according to claim 4, wherein the oil induces in the glass a central tensile stress in the range 300 kg./cm.$^2$ to 460 kg./cm.$^2$.

6. A method according to claim 4, wherein the glass to be toughened is soda-lime-silica glass and wherein the glass is heated to a temperature in the range 650° to 740° C.

7. A method of toughening glass whose thickness is in the range 0.5 mm. to 2.5 mm., comprising heating the glass to a temperature near its softening point, and quenching the hot glass with a selected oil whose viscosity is in the range 300 to 1,000 centistokes at 38° C. and whose flash point is in the range 220° to 310° C., whilst maintaining the temperature of the oil in the range 150° to 200° C., thereby inducing in the glass a ratio of surface compressive stress to central tensile stress in the range 2.5:1 to 3.5:1.

8. A method according to claim 7, wherein the oil induces in the glass a central tensile stress in the range 350 kg./cm.$^2$ to 455 kg./cm.$^2$.

9. A method according to claim 7, wherein the glass to be toughened is soda-lime-silica glass and wherein the glass is heated to a temperature in the range 685° to 740° C.

10. A method according to claim 1, wherein the glass is 2 mm. thick, comprising heating the glass to 700° C., quenching the hot glass in an oil whose viscosity is 640 centistokes at 38° C. and whose flash point is 275° C., which oil is maintained at 200° C.

* * * * *

UNITED STATES PATENT OFFICE
CERTIFICATE OF CORRECTION

Patent No. 3,640,694                    Dated  Feb. 28, 1972

Inventor(s)  David George Giddings and Douglas Twist

It is certified that error appears in the above-identified patent and that said Letters Patent are hereby corrected as shown below:

Priority of British application    "3,195/69" should be --31951/69--

Signed and sealed this 29th day of August 1972.

(SEAL)
Attest:

EDWARD M. FLETCHER, JR.                ROBERT GOTTSCHALK
Attesting Officer                      Commissioner of Patents